United States Patent

Glennon

[11] Patent Number: 5,930,134
[45] Date of Patent: Jul. 27, 1999

[54] STARTING SYSTEM FOR A PRIME MOVER

[75] Inventor: Timonthy F. Glennon, Rockford, Ill.

[73] Assignee: Sundstrand Corporation, Rockford, Ill.

[21] Appl. No.: 08/885,354

[22] Filed: Jun. 30, 1997

[51] Int. Cl.⁶ .................................................. H02M 7/219
[52] U.S. Cl. ........................... 363/127; 363/26; 318/431
[58] Field of Search ............................... 363/17, 26, 127, 363/163, 164; 318/430, 431

[56] References Cited

U.S. PATENT DOCUMENTS

| | | | |
|---|---|---|---|
| 2,908,776 | 10/1959 | Nolden et al. | 200/4 |
| 3,132,297 | 5/1964 | Erikson | 322/59 |
| 3,519,843 | 7/1970 | Trautman | 307/65 |
| 3,555,290 | 1/1971 | Ellermeyer | 306/65 |
| 4,356,402 | 10/1982 | Morimoto et al. | 307/19 |
| 4,467,220 | 8/1984 | Page | 307/19 |
| 4,638,175 | 1/1987 | Bradford et al. | 307/64 |
| 4,659,942 | 4/1987 | Volp | 307/19 |
| 4,743,776 | 5/1988 | Baehler et al. | 290/31 |
| 4,830,412 | 5/1989 | Raad et al. | 290/31 |
| 4,862,342 | 8/1989 | Dhyanchand et al. | 363/40 |
| 5,036,267 | 7/1991 | Markunas et al. | 322/10 |
| 5,055,764 | 10/1991 | Rozman et al. | 322/10 |
| 5,175,439 | 12/1992 | Harer et al. | 363/37 |
| 5,266,838 | 11/1993 | Gerner | 307/19 |
| 5,309,081 | 5/1994 | Shah et al. | 322/10 |
| 5,589,743 | 12/1996 | King | 318/139 |
| 5,594,322 | 1/1997 | Rozman et al. | 318/254 |
| 5,726,550 | 3/1998 | Inaniwa et al. | 318/803 |

Primary Examiner—Peter S. Wong
Assistant Examiner—Derek J. Jardieu
Attorney, Agent, or Firm—Marshall, O'Toole, Gerstein, Murray & Borun

[57] ABSTRACT

A starting system for a prime mover coupled to a generator includes a step-up inverter which converts DC power at a first voltage into AC power at a second, higher voltage. Halfwave pulses in the AC power are selectively applied to the generator by a pulse-population inverter coupled to the step-up inverter such that the generator is operated as a motor to supply motive starting power to the prime mover.

20 Claims, 4 Drawing Sheets

STARTING SYSTEM FOR A PRIME MOVER

TECHNICAL FIELD

The present invention relates generally to starting systems, and more particularly to a starting system for a prime mover, such as an aircraft engine.

BACKGROUND ART

Modern aircraft typically include at least one, and usually two or more prime movers in the form of main engines which not only supply thrust for the aircraft but also power for numerous loads. In addition, an auxiliary power unit (APU) is typically provided on-board the aircraft and drives a generator. The APU is conventionally started by a DC motor and clutch arrangement which receives starting power from a 28 volt battery. Such a starting system has reliability and maintainability problems due to the DC motor brushes and the clutch.

In an attempt to eliminate these problems, the DC motor and the clutch arrangement have been omitted and power converter electronics have been added to operate the generator coupled to the APU as a motor to supply the required starting motive power to the APU. The power electronics include a step-up inverter to convert the 28 volt DC power into 150 volt DC power, an AC inverter to supply conditioned power to the main generator armature coils and an exciter inverter to provide field current to the main generator field winding via the generator exciter. While such a system works well, it has proved to be too costly.

A further start system has been devised utilizing two inverters, one of which directly converts 28 volt DC power to AC power for the main generator armature windings and another inverter for providing main generator field current via the exciter of the generator. Such a starting system is not completely satisfactory owing to the relatively low source voltage and due to the absence of means for increasing the voltage applied to the generator.

SUMMARY OF THE INVENTION

A starting system for a prime mover provides a low cost, yet flexible solution to the foregoing problems.

More specifically, according to one aspect of the present invention, a starting system for a prime mover includes a generator having an armature winding and a field winding, a first power converter developing a first alternating waveform and a second power converter coupled to the first power converter. The second power converter provides a second alternating waveform to the generator armature winding comprising a series of pulses selected from the first alternating waveform. The second power converter comprises a first bidirectional switch coupled between an input of the second power converter and a generator armature winding and a second bidirectional switch coupled between the generator armature winding and a source of potential wherein the first and second bidirectional switches are alternately operable to produce the second alternating waveform.

Preferably, the prime mover comprises an auxiliary power unit (APU). Also preferably, the first power converter comprises an inverter which receives DC power. The first power converter may include first and second inverter switches coupled to first and second primary windings of the transformer having a secondary winding coupled to the second power converter. According to an alternate embodiment, the first and second inverter switches are controlled in a pulse-width-modulated mode of operation.

Still further in accordance with the preferred embodiment, the first and second bidirectional switches are controlled to maintain a substantially constant volt-second figure in the second alternating waveform.

According to a highly preferred form of the present invention, the generator is of the brushless, synchronous type and a centrifugal switch is provided for shorting the field winding of the generator.

According to a further aspect of the present invention, a starting/generating system includes a prime mover, a generator coupled to the prime mover and having a neutral, a set of polyphase armature windings and a field winding and a first inverter which converts DC battery power into a first alternating waveform. A second inverter is coupled to the first inverter and the first inverter includes first and second inverter switches coupled to first and second primary windings of a step-up transformer. The transformer includes a set of secondary windings and the second inverter includes a first set of bidirectional switches coupled between the set of secondary windings and the set of polyphase armature windings and a second set of bidirectional switches coupled between the set of polyphase armature windings and the neutral. An inverter control operates the first and second bidirectional switches during operation in a starting mode to deliver polyphase second alternating waveforms to the polyphase armature windings and thereby operate the generator as a motor to start the prime mover. Each of the polyphase second alternating waveforms comprises a second series of halfwave pulses selected from the first alternating waveform.

According to yet another aspect of the present invention, a starting/generating system operable in starting and generating modes includes an aircraft auxiliary power unit, a brushless, synchronous generator coupled to the prime mover and including a main generator portion having a set of three-phase armature windings and a field winding and a first inverter which converts DC battery power into a first alternating waveform. A second inverter is coupled to the first inverter and the first inverter includes first and second inverter switches coupled to the first and second primary windings of a step-up transformer. The transformer includes a set of three secondary windings and the second inverter includes a first set of three bidirectional switches coupled between the set of three secondary windings and an output of the second inverter and a second set of three bidirectional switches coupled between the second inverter output and ground potential. Contactors are operable in the starting mode to connect the second inverter output to the set of armature windings and further are operable in the generating mode to connect the set of armature windings to a load bus. A centrifugal switch is operable in the starting mode for shorting the main generator portion field winding. In addition, a pulse-population inverter control operates the bidirectional switches during operation in a starting mode to deliver three-phase alternating waveforms developed by selecting pulses from the first alternating waveform to the set of armature windings and thereby operate the generator as a motor to start the prime mover.

Other aspects and advantages of the present invention will become apparent upon consideration of the following drawings and detailed description as a preferred embodiment.

DESCRIPTION OF THE PREFERRED EMBODIMENTS

Figure 1:
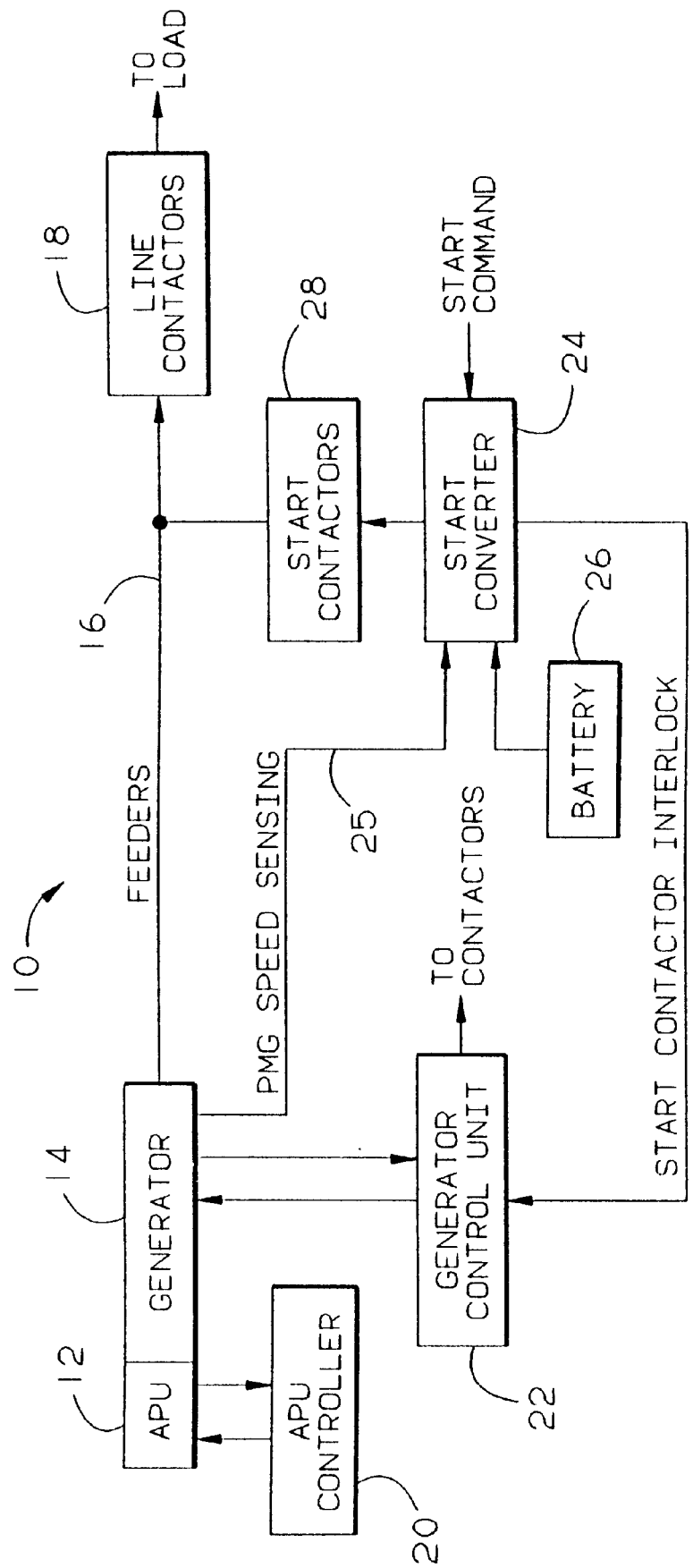
FIG. 1 is a block diagram of a starting/generating system according to the present invention.

Referring now to FIG. 1, a power conversion system 10 converts between motive and electrical power. The system 10 includes a prime mover in the form of an aircraft auxiliary power unit (APU) 12, which is coupled to a generator 14. The APU 12 may be connected to the generator 14 by direct connection or may be connected through a gearbox (not shown). The generator 14 is coupled by a set of feeders 16 and a set of line contactors 18 to one or more electrical loads.

The APU 12 is controlled by a controller 20 which senses and controls the fuel and ignition sequence of the APU 12. In addition, the controller 20 may provide protective functions and built-in test functions. The generator 14 is controlled by a generator control unit (GCU) 22 which senses and controls the output power of the generator 14 and further provides protection and built-in test functions.

A start converter 24 is responsive to a start command as well as a generator speed signal developed on a line 25 to convert DC power supplied by a battery 26 into AC power. This AC power is supplied to the feeders 16 during operation in a starting mode to cause the generator 14 to operate as a motor and supply motive starting power to the APU 12.

It should be noted that the line contactors 18 and the start contactors 28 are operated by the GCU 22.

It should further be noted that power for the start converter 24 may be obtained from any other source, such as an external AC or DC power source such as may be included in a ground power cart. In the case of AC external power, existing transformer rectifier units on the aircraft (not shown) can be used to develop the 28 VDC start power.

In addition to the foregoing, although single lines are shown between the generator 14 and the contactors 18, 28 and the start converter 24, it should be realized that single or polyphase power (typically three-phase) may be transferred between these elements.

After the generator 14 has brought the APU 12 up to self-sufficient speed the APU 12 drives the generator 14 to supply power via the feeders 16 and the line contactors 18 to the loads. During operation in the generating mode, the start contactors 28 are open.

Figure 2:
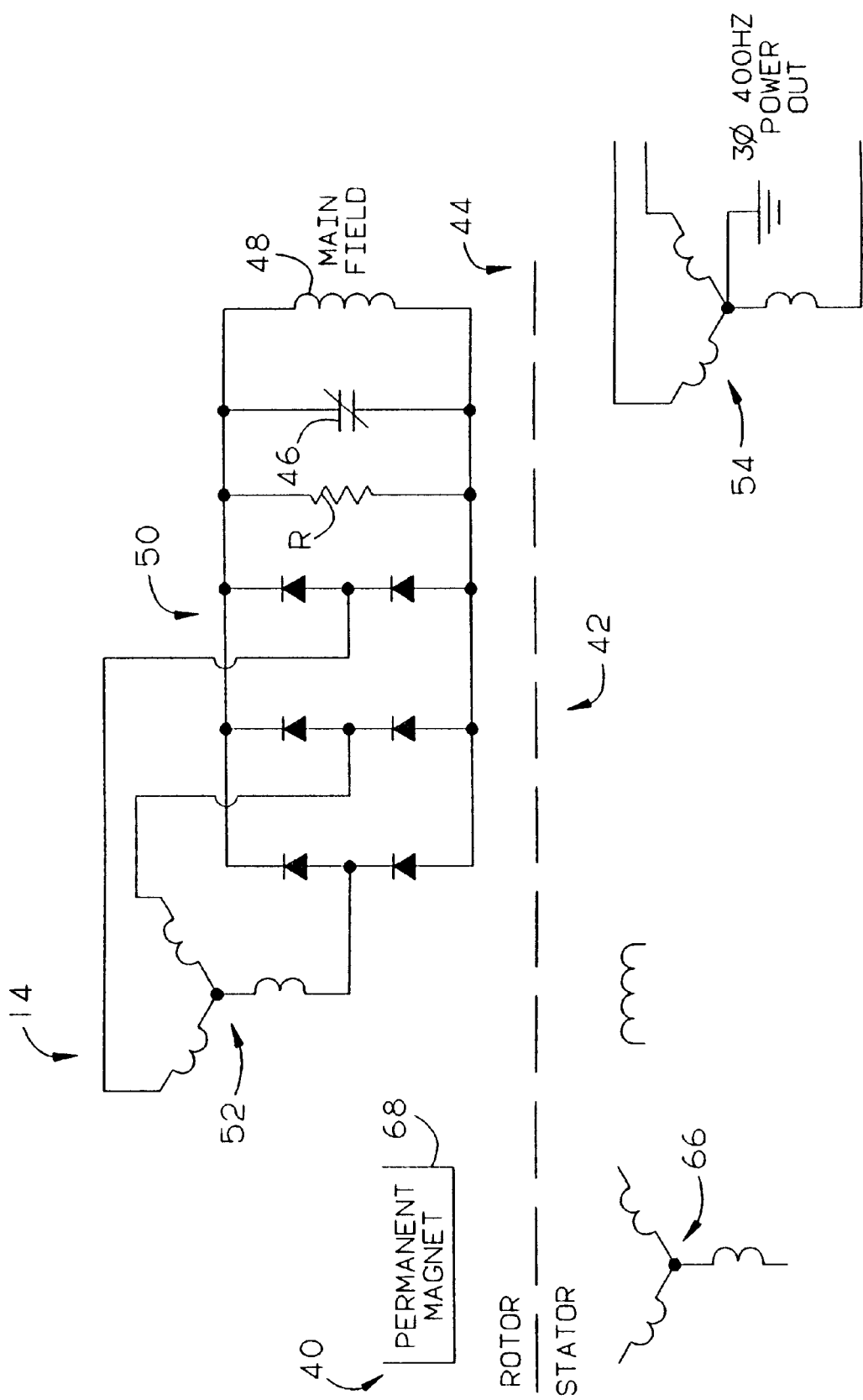
FIG. 2 is a schematic diagram of the generator of FIG. 1.

FIG. 2 illustrates the generator 14 in greater detail. The generator 14 includes a PMG portion 40, which develops the generator speed signal on the line 25, an exciter portion 42 and a main generator portion 44. Preferably, the generator 14 comprises a conventional brushless, synchronous generator which has been modified through the addition of a centrifugal switch 46 which is connected in parallel across a main field winding 48. The centrifugal switch shorts the main field winding 48 at speeds up to a particular percentage of normal operating speed. In the preferred embodiment, shorting of the main field winding 48 occurs up to 65±5% of normal operating speed, although this figure may be changed in accordance with the generator characteristics. Shorting the main field winding 48 during operation in this speed range prevents too much voltage from being generated across a set of rotating rectifiers 50 interconnecting a set of exciter armature windings 52 and the main field winding 48 due to the transformer action of the main field winding 48 and a set of main generator portion armature windings 54 during induction motor starting. A resistor R coupled across the main field winding 48 limits reverse voltage transients on the rectifiers 50 due to load or parallel interactions coupled through the main field winding 48 during operation in the generating mode.

In addition to this modification, amortisseur bars on the rotor of the generator 14 are specifically designed for the induction motor start in a known fashion.

Once the centrifugal switch 46 opens, the generator 14 behaves like a normal synchronous generator.

Figure 3:
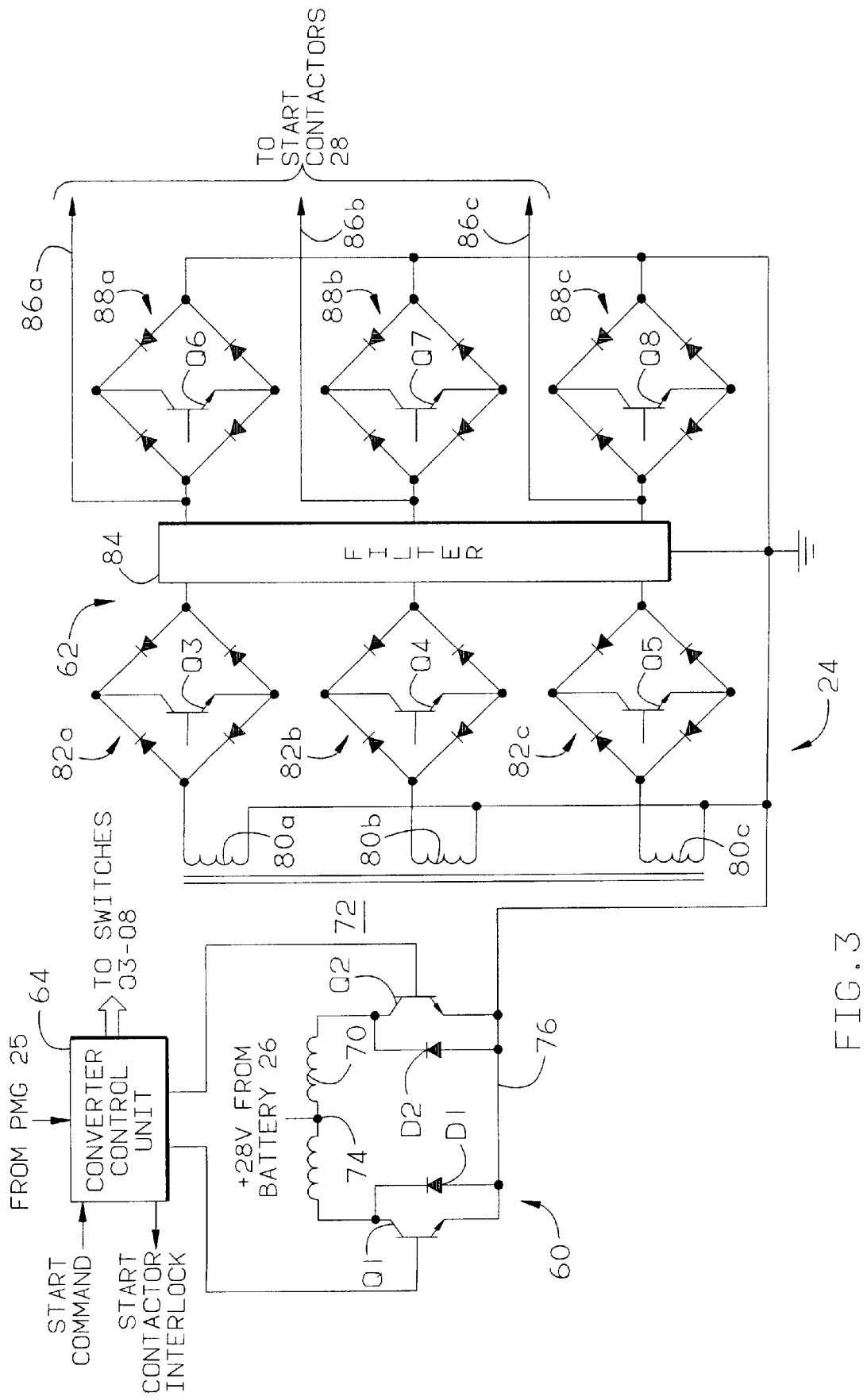
FIG. 3 is a schematic diagram illustrating the topology of the start converter of FIG. 1.

FIG. 3 illustrates the start converter 24 in greater detail. The start converter 24 includes a first or step-up inverter 60 and a further inverter 62. The inverters 60, 62 are controlled by a converter control unit 64, which is responsive to the start command noted above and the speed signal on the line 25, which is developed across one of a set of PMG armature windings 66, FIG. 2.

The converter control unit 64 alternately operates first and second switches Q1, Q2 in the step-up converter 60. The switches Q1, Q2, which may comprise controlled power switching devices of sufficient current handling capability, such as power MOSFET'S, IGBT's, or the like, are connected to opposite ends of a primary winding 70 of a transformer 72. The primary winding 70 includes a mid-tap 74 which is coupled to the positive terminal of the battery 26. A negative terminal of the battery 26 is coupled to a ground conductor 76. The transformer 72 steps up the voltage of the battery 26 from a battery supply voltage of approximately 28 volts to a substantially higher voltage, such as 150–300V. Flyback diodes D1 and D2 are coupled across the power switches Q1 and Q2, respectively, to provide a path for regenerative currents and to prevent large voltage spikes from appearing thereacross.

The transformer 72 includes first, second, and third secondary windings 80a, 80b, and 80c which are in turn coupled through three bidirectional switches 82a, 82b, and 82c to a filter network 84. The filter network 84 is in turn coupled by output lines 86a, 86b, and 86c of the inverter 62 to the start contactor 28. Three additional bidirectional switches 88a–88c are coupled between the output lines 86a–86c and ground potential on the line 76.

Each of the bidirectional switches 82a–82c and 88a–88c comprises a power transistor, such as an IGBT or power MOSFET, and associated diodes connected in a bridge configuration. The power transistor is connected across two of the vertices of the diode bridge whereas the remaining vertices are coupled to the filter and the respective secondary winding 80a–80c or the line 76, thereby forming a bidirectional switch.

Figure 4:
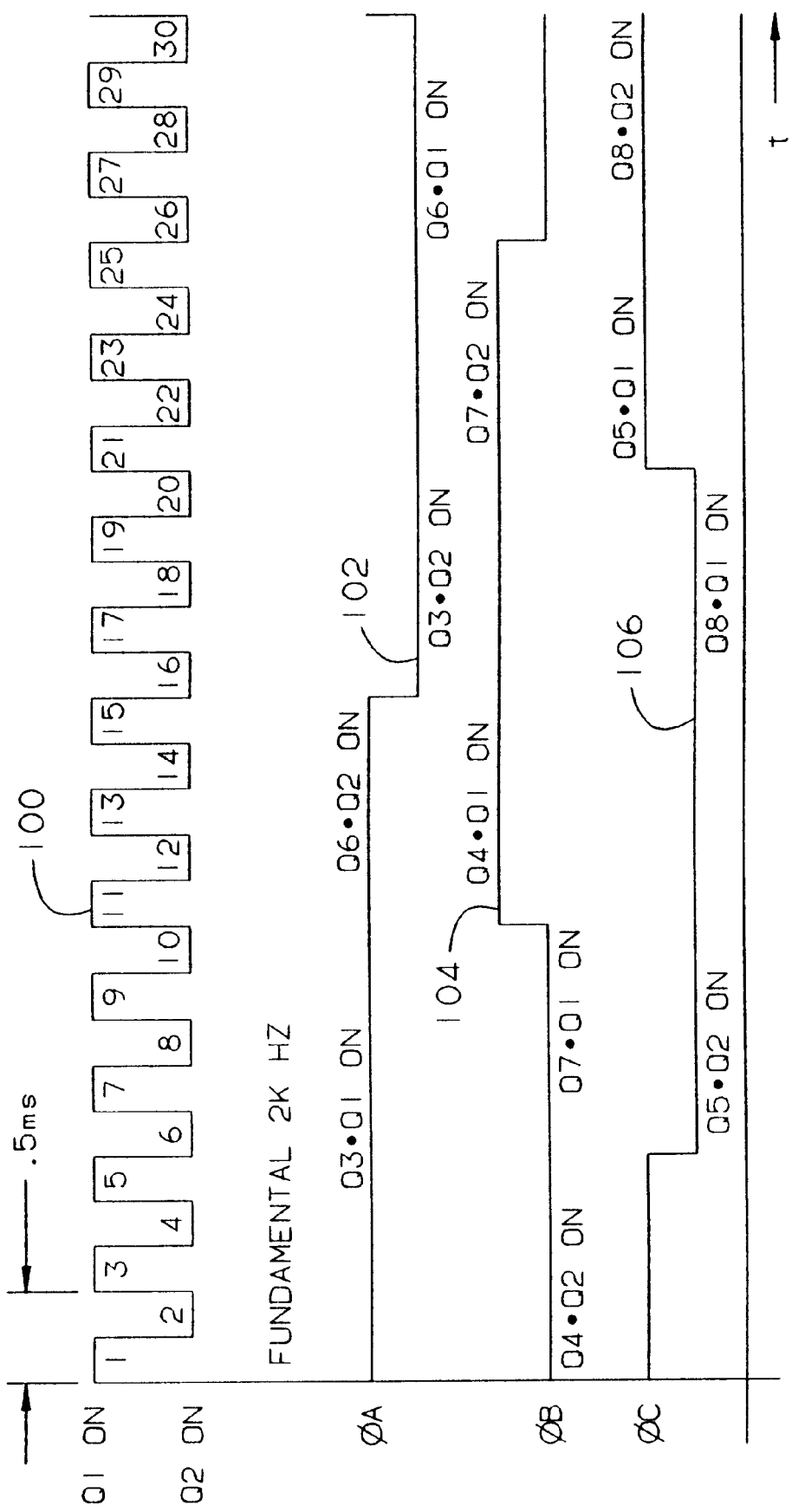
FIG. 4 comprises a series of waveform diagrams illustrating the operation of the start converter of FIG. 3.

FIG. 4 illustrates waveform diagrams showing the operation of the start converter 24. The square wave 100 illustrates the operation of the step-up converter 60. Specifically, the switches Q1 and Q2 are alternately operated at a frequency of, for example, 2 kilohertz, to obtain the waveform 100. When the waveform 100 is in a high state, the power switch Q1 is on while the power switch Q2 is off. Conversely, when the waveform 100 is in a low state, the power switch Q2 is on while the power switch Q1 is off. In the illustrated embodiment, the waveform 100 comprises a square wave, i.e., the high state portions and low state portions are of equal duration. If necessary or desirable, the switches Q1 and Q2 may alternatively be operated in a pulse-width-modulated mode of operation, for example, at the beginning of operation in a starting mode, or to accomplish current limiting.

In the preferred embodiment, the second inverter 62 operates in a pulse-population mode of operation to select halfwave pulses from the waveform 100 and to apply such pulses as an alternating waveform to the armature windings 54 of the main generator portion 44 (FIG. 2). The number of selected halfwave pulses is determined as a function of frequency to provide constant volt-seconds per cycle. At the beginning of starting, the fundamental frequency of the waveforms applied to the generator armature windings 54 is gradually increased as pulses from the waveform 100 are added to maintain the constant volt seconds per cycle figure noted above. The waveforms 102, 104 and 106 illustrate phase waveforms at 133.3 hertz, which is the maximum frequency to be applied to the generator 14. Under this condition, fifteen of the halfwave pulses from the waveform 100 are selected per half-cycle to produce the desired waveshapes. When a fundamental frequency equal to 1/15th of the illustrated frequency is to be applied, only one pulse per half-cycle is selected to obtain the required volt-second product, unless pulse-width-modulation is employed in the step-up inverter 60.

The first 180° of the waveform 102 is obtained by turning on the bidirectional switch 82a when the power switch Q1 is on (during which time the switches 88a and Q2 are off) and by turning on the bidirectional switch 88a when the power switch Q2 is on (at which point the switches 82a and Q1 are turned off). The switch 88a provides a path for regenerative current. During the second 180° portion, the switch 82a is turned on when the power switch Q2 is on (switches Q1 and 88a are off) whereas these bidirectional switch 88a is turned on when the switch Q1 is on (switches Q2 and 82a are off).

The switch states to produce the waveforms 104 and 106 are similarly indicated in FIG. 4. As with the bidirectional switch 88a, the bidirectional switches 88b and 88c provide paths for regenerative phase currents when the respective source phase switch (i.e., bidirectional switches 82b and 82c, respectively) is opened.

The output filter 84 is used for EMI and fundamental low frequency wave shaping.

If desired, the applied waveforms can be further shaped by the converter control unit 64 in a known fashion so that the applied waveforms are closer to a sine wave. This is accomplished by omitting more pulses at the beginning and end of each halfwave.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

I claim:

1. A starting system for a prime mover, comprising:
 a generator having an armature winding and a field winding;
 a first power converter developing a first alternating waveform; and
 a second power converter coupled to the first power converter and providing a second alternating waveform to the generator armature winding comprising a series of pulses selected from the first alternating waveform;
 wherein the second power converter comprises a first bidirectional switch coupled between an input of the second power converter and the generator armature winding and a second bidirectional switch coupled between the generator armature winding and a source of potential and wherein the first and second bidirectional switches are alternately operable to produce the second alternating waveform.

2. The starting system of claim 1, wherein the prime mover comprises an auxiliary power unit (APU).

3. The starting system of claim 1, wherein the first power converter comprises an inverter which receives DC power.

4. The starting system of claim 3, wherein the first power converter includes first and second inverter switches coupled to first and second primary windings of a transformer having a secondary winding coupled to the second power converter.

5. The starting system of claim 4, wherein the first and second inverter switches are controlled in a pulse-width modulated mode of operation.

6. The starting system of claim 1, wherein the first and second bidirectional switches are controlled to maintain a substantially constant volt-second figure in the second alternating waveform.

7. The starting system of claim 1, wherein the generator is of the brushless, synchronous type.

8. The starting system of claim 1, further including a centrifugal switch for shorting the field winding.

9. A starting/generating system, comprising:
 a prime mover;
 a generator coupled to the prime mover and having a neutral, a set of polyphase armature windings and a field winding;
 a first inverter which converts DC battery power into a first alternating waveform;
 a second inverter coupled to the first inverter;
 wherein the first inverter includes first and second inverter switches coupled to first and second primary windings of a step-up transformer having a set of secondary windings and wherein the second inverter includes a first set of bidirectional switches coupled between the set of secondary windings and the set of polyphase armature windings and a second set of bidirectional switches coupled between the set of polyphase armature windings and the neutral; and
 an inverter control which operates the first and second sets of bidirectional switches during operation in a starting mode to deliver polyphase second alternating waveforms to the polyphase armature windings and thereby operate the generator as a motor to start the prime mover wherein each of the polyphase second alternating waveforms comprises a second series of halfwave pulses selected from the first alternating waveform.

10. The starting/generating system of claim 9, wherein the prime mover comprises an aircraft auxiliary power unit (APU).

11. The starting/generating system of claim 10, wherein the generator is operable in a generating mode to convert motive power produced by the APU into electric power on a power bus.

12. The starting/generating system of claim 11, further including means for connecting the generator to a start bus during operation in the starting mode and means for connecting the generator to a load bus during operation in the generating mode.

13. The starting/generating system of claim 12, wherein the generator is of the brushless, synchronous type.

14. The starting/generating system of claim 13, wherein the generator includes a main generator portion having a field winding and further including means for shorting the field winding during operation in the starting mode.

15. The starting/generating system of claim 14, wherein the shorting means comprises a centrifugal switch.

16. The starting/generating system of claim 9, wherein the first and second inverter switches are controlled in a pulse-width modulated mode of operation.

17. The starting/generating system of claim 9, wherein the first and second sets of bidirectional switches are controlled to maintain a substantially constant volt-second figure in the polyphase second alternating waveforms.

18. A starting/generating system operable in starting and generating modes, comprising:

an aircraft auxiliary power unit;

a brushless, synchronous generator coupled to the prime mover and including a main generator portion having a set of three-phase armature windings and a field winding;

a first inverter which converts DC battery power into a first alternating waveform;

a second inverter coupled to the first inverter;

wherein the first inverter includes first and second inverter switches coupled to first and second primary windings of a step-up transformer having a set of three secondary windings and wherein the second inverter includes a first set of three bidirectional switches coupled between the set of three secondary windings and an output of the second inverter and a second set of three bidirectional switches coupled between the second inverter output and a neutral potential;

contactors operable in the starting mode to connect the second inverter output to the set of armature windings and operable in the generating mode to connect the set of armature windings to a load bus;

a centrifugal switch operable in the starting mode for shorting the main generator portion field winding; and a pulse-population inverter control which operates the bidirectional switches during operation in a starting mode to deliver three-phase alternating waveforms developed by selecting pulses from the first alternating waveform to the set of armature windings and thereby operate the generator as a motor to start the prime mover.

19. The starting/generating system of claim 18, wherein the first and second inverter switches are controlled in a pulse-width modulated mode of operation.

20. The starting/generating system of claim 18, wherein the first and second sets of bidirectional switches are controlled to maintain a substantially constant volt-second figure in the three-phase second alternating waveforms.

\* \* \* \* \*